March 12, 1929. J. E. FITZGERALD Re. 17,232

DOUBLE SHIPPING CONTAINER

Original Filed Dec. 24, 1926

INVENTOR

James E. Fitzgerald

Davis, Hudson and Kent

ATTORNEY

Reissued Mar. 12, 1929. Re. 17,232

UNITED STATES PATENT OFFICE.

JAMES E. FITZGERALD, OF YOUNGSTOWN, OHIO, ASSIGNOR TO THE NILES STEEL PRODUCTS COMPANY, OF NILES, OHIO, A CORPORATION OF OHIO.

DOUBLE SHIPPING CONTAINER.

Original No. 1,669,511, dated May 15, 1928, Serial No. 156,804, filed December 24, 1926. Application for reissue filed August 9, 1928. Serial No. 298,589.

This invention relates to a double container adapted particularly for the shipment of ingredients for certain kinds of paint, such as aluminum and bronze paint, this article having two compartments or container bodies, one for the liquid and the other for the powder.

The object of the present invention is to provide a double container of this kind including two container bodies, one adapted to be fitted inside the other and both adapted to be closed and sealed in one closing operation and by the same closing member.

A further object is to provide a construction wherein not only are both containers closed in one closing operation but wherein each has a gasket seal, the gasket sealing for both container bodies being preferably accomplished with the use of a single gasket.

Figure 1:
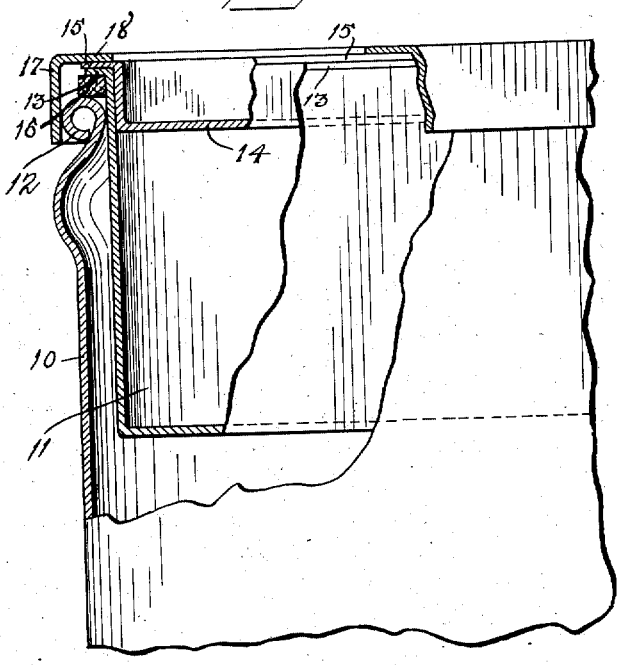
Figure 2:
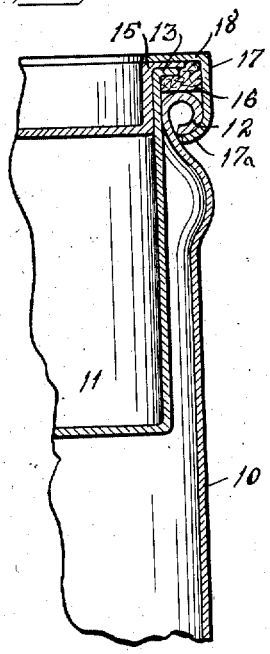
Figure 3:
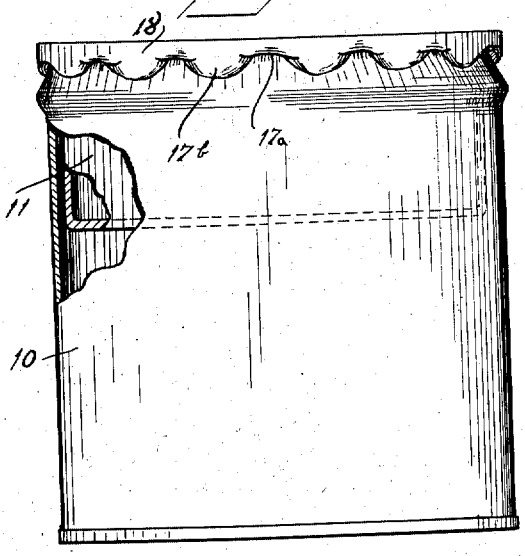
Figure 4:
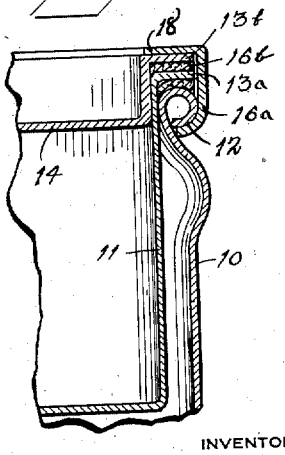

In the accompanying sheet of drawings, Fig. 1 is a side elevation of my improved double container with both container bodies in closed and sealed condition, parts being broken away; Fig. 2 is an enlarged fragmentary sectional view with the parts in the relative positions which they occupy prior to the closing operation; Fig. 3 is a similar view after the closing operation; and Fig. 4 is a view similar to Fig. 3 showing a slight modification.

My improved double container comprises two container bodies 10 and 11, the former being deeper and of slightly greater diameter than the latter so that the smaller container 11 can be slipped down into the open top of the larger container 10. In the use of this double container for shipment of paint ingredients, the liquid is placed in the larger container and the aluminum, bronze or other powder in the container body 11.

It will be observed that the larger or outer container 10 is provided at the top with a roller bead 12 and that the inner container 11 has a straight body portion of such diameter that it will just fit and slide down inside of the bead 12. Furthermore, the inner container body 11 is provided at the top with an outwardly extending flange 13 which overlies the bead 12, and this container body has a cover 14 with a depressed part which fits tightly into the top of the container body 11, the cover having an outwardly extending flange 15 which overlies the flange 13 and preferably extends outwardly somewhat further than the flange 13. In fact, in the preferred embodiment, the outer periphery of the flange 13 is near the circular center line of the bead 12 or it may project slightly beyond the same, while the flange 15 projects outwardly beyond the flange 13 as above stated.

In the preferred embodiment of the invention, a single gasket 16 is employed to seal both containers, which gasket is placed between the bead 12 and the flange 13 on the body of the container 11. As far as the broad features of my invention are concerned, it is immaterial whether one gasket or two gaskets are utilized, one between the bead of the outer container and the flange of the inner container, and the other between the flange of the inner container and the flange of the cover. However, when a single gasket is employed, as illustrated in Figs. 2 and 3, it is important that the flange 15 of the cover project outwardly further than the flange 13 of the inner container, as will appear presently.

For the purpose of closing both container bodies, in one closing operation, a sealing ring 18 is employed, this being a continuous ring having separable ends, which can be formed by overlapping the ends and spot welding or otherwise fastening them together, and being provided also with a downwardly extending flange 17 which fits around the bead 12, and having a horizontal inwardly extending portion which overlies the flange 15 of the cover 14.

The downwardly extending flange 17 of the sealing ring is preferably continuous, and in the closing operation a closing tool is employed which first presses the parts down onto the bead 12, compressing the gasket 16, and then crimps spaced portions $17^a$ of the flange 17 inwardly under the bead, leaving between the crimped portions $17^a$ uncrimped portions $17^b$.

This type of sealing ring and the described method of closing is more fully set forth in a pending application filed by me August 19, 1926, Serial No. 130,215, wherein the sealing ring is employed for the closure of a single container. It may be here stated, however, that in the closing operation the crimped portions $17^a$ are bent inwardly tightly against the under side of the bead and generally in contact with the body of the container beneath the bead, these portions being crimped inwardly at substantially right angles; and in this crimping operation, the intervening uncrimped portions $17^b$ are slightly drawn inwardly and where they merge with the crimped portions they are curved inwardly, forming the equivalent of curved arches joining the crimped portions and adding considerably to the strength of the top portion of the closed container.

With the preferred embodiment of my invention wherein a single gasket is employed, during this closing operation the gasket is not only highly compressed between the bead 12 and the flange 13 but inasmuch as the flange 15 extends outwardly beyond the flange 13, the gasket, by its expansion around or outside of the flange 13, and generally also around or outside of the flange 15, effectively seals the inner container as well, as that leakage of powder from the inner container as well as leakage of liquid from the outer container is effectively prevented by the single gasket 16.

The single gasket, with the sealing ring and with the flanges proportioned substantially as herein described and illustrated, effectively seals both containers as above explained. It is obviously cheaper than a construction employing two gaskets and more economical from the assembling aspect, but, as already stated, I regard it within the scope of my invention to utilize two gaskets, in which event the horizontal flanges on the inner container and cover respectively may extend outwardly co-extensively. The construction when employing two separate gaskets is illustrated in Fig. 4, wherein the flanges on the inner container and cover are designated respectively $13^a$ and $13^b$, and the two gaskets, one between the bead and the flange $13^a$ and the other between the latter and the flange $15^a$ are designated respectively $16^a$ and $16^b$. With the two gaskets, the sealing of both container bodies is accomplished at the same time and by the use of one sealing ring, as in the first described construction.

When it is desired to use the paint ingredients contained in the two container bodies, it is only necessary to separate the separable ends of the sealing ring and then strip the sealing ring off the top of the double container. The inner container can then be lifted out to give access to the liquid in the outer container, and the cover can be lifted from the inner container to give access to the powder therein. It will be understood, of course, that while the container bodies are described as being adapted preferably for receiving respectively the liquid and powder for making aluminum or bronze paint, it is obvious that they may be employed for the shipment of other materials.

I do not desire to be confined to a sealing ring as an element separate from and independent of the cover though that arrangement is preferred, for in some instances, the outer sealing flange may be made an integral part of the flange 15 of the cover. In that event, to remove the cover the inwardly crimped portions will be pried outwardly with a suitable tool.

It will be apparent, furthermore, that the location of the gasket 16 beneath the flange 13 of the inner container body is not essential, since the placing of the gasket above that flange will still accomplish the sealing of the two container bodies with a single gasket, so long as the flange 13 extends outwardly a less distance than the bead 12 and the peripheral portion 15 of the cover. In both cases the inner portion of the gasket seals one container body and the outer portion of the gasket seals the other container body. Therefore, I do not desire to be confined to the precise details shown and described but aim in my claims to cover all modifications which do not involve a departure from the spirit and scope of my invention.

Having thus described my invention, what I claim is:

1. In a double shipping container, an outer container body having at the top an outwardly projecting shoulder, a gasket overlying said shoulder, an inner container body having at the top a flange overlying the inner portion of the gasket, a cover for the inner container body having a marginal portion extending outwardly over said flange and beyond the same, and a sealing ring having an inwardly extending portion overlapping the marginal portion of the cover and having a flange extending downwardly around said shoulder and adapted to be turned inwardly beneath the same.

2. In a double shipping container, an outer container body having at the top an outwardly projecting bead, an inner container body fitted into the open top of the first named container body and having a flange projecting over said bead for a limited distance radially, a gasket between said bead and the flange and projecting outwardly beyond the latter, a cover having a depressed portion fitted into the top of the inner container body and having a flange overlying the flange of the inner container body, and extending outwardly beyond the same and a sealing ring having an inwardly extending flange overlapping the flange of the cover and having a downwardly extending flange surrounding said bead of the outer container body and adapted to be turned inwardly beneath the same.

3. In a double shipping container, an outer container having at the top an outwardly projecting shoulder, a gasket overlying said shoulder, an inner container having at the top a flange overlying the inner portion of the gasket, a cover for the inner container having a marginal portion extending outwardly over said flange and beyond the same, and means for clamping down said flange and marginal portion to compress said gasket, said means comprising a ring against which the outer periphery of said gasket bears.

4. In a double shipping container, an outer container body having a shoulder at the top thereof, an inner container body having at the top a flange overlying the inner portion only of the shoulder, a cover for the inner container body having a marginal portion extending outwardly over said flange and beyond the same, and a gasket adapted to engage both said flange and said marginal portion for sealing both container bodies.

5. In a double shipping container, an outer container body having a shoulder at the top thereof, an inner container body having at the top a flange overlying the inner portion only of the shoulder, a cover for the inner container body having a marginal portion extending outwardly over said flange and beyond the same, a gasket below said cover for sealing both the inner and the outer container bodies, said gasket overlapping said flange and extending outwardly therebeyond, whereby the inner portion of the gasket seals one container body and the outer portion seals the other container body, and means for clamping said cover down upon said outer container body.

6. A double shipping container comprising an outer container having a shoulder at the top thereof, an inner container having at the top a flange overlying said shoulder, a cover for the inner container having a marginal portion extending outwardly over said flange, a sealing ring for clamping the cover to the inner container and the inner container to the outer container, said sealing ring having a continuous downwardly extending flange, a gasket within said ring flange, said ring flange being adapted to confine said gasket, whereby the clamping pressure serves to squeeze the gasket outwardly into contact with said ring flange and vertically into contact with the outer edges of said marginal portion and inner container flange, sealing both the inner and the outer containers.

7. A shipping container comprising an outer container body having a shoulder at the top thereof, an inner container having at the top an outwardly extending flange overlying said shoulder, a cover for the inner container having a marginal portion overlying said flange, a sealing ring having an inwardly extending flange overlying said marginal portion of the cover, and an outer downwardly extending flange adapted to be bent under said shoulder, and a gasket arranged between two of the superposed parts and clamped therebetween in the closing operation, the outer portion of the gasket being capable of expanding inside the downwardly extending flange of the sealing ring both outwardly and vertically so as to seal both containers.

JAMES E. FITZGERALD.